Feb. 4, 1969   H. S. SANTEFORD, JR   3,425,226
SUBSURFACE DISPOSAL SYSTEM
Filed July 25, 1966
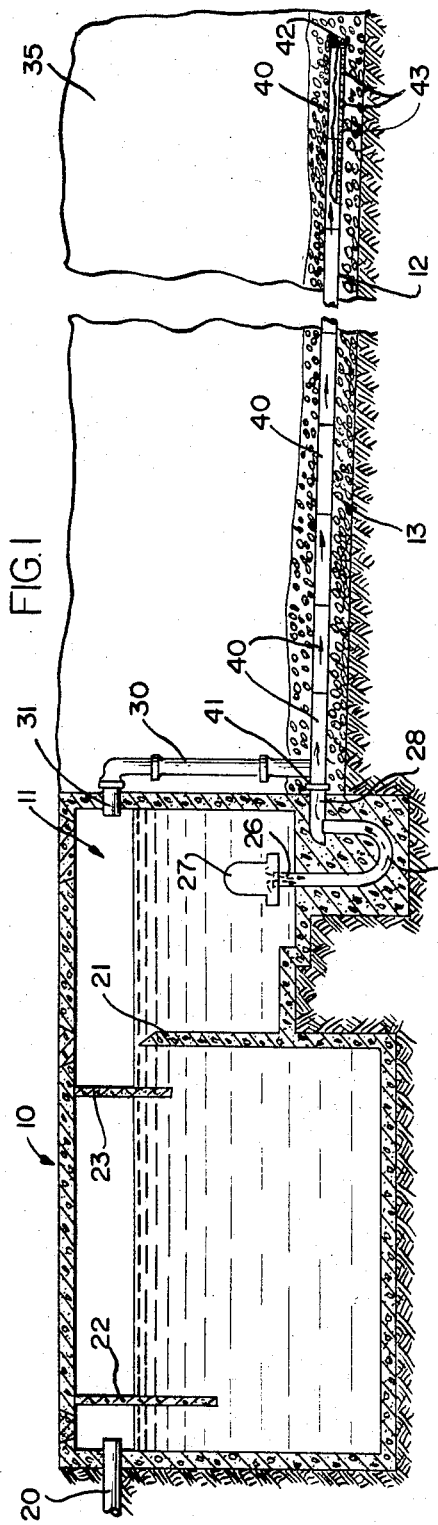
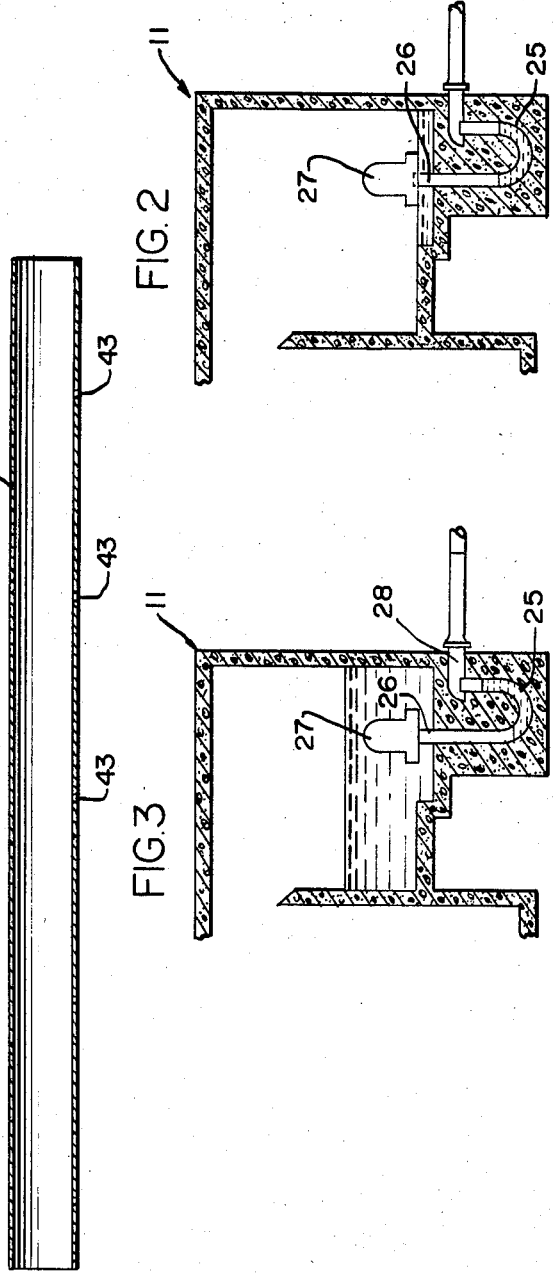
INVENTOR.
HENRY S. SANTEFORD JR.
BY *Hofgren, Wegner, Allen,*
*Stellman & McCord*
ATTORNEYS.

United States Patent Office 3,425,226
Patented Feb. 4, 1969

3,425,226
SUBSURFACE DISPOSAL SYSTEM
Henry S. Santeford, Jr., 201 Quincy St., Apt. 2,
Hancock, Mich. 49930
Filed July 25, 1966, Ser. No. 567,670
U.S. Cl. 61—13                                        5 Claims
Int. Cl. E03f 1/00, 5/00

ABSTRACT OF THE DISCLOSURE

A subsurface disposal system for effluent having a septic tank with a dosing chamber for discharging quantities of effluent periodically from the septic tank in combination with a pipe system for the distribution field having a series of pipe sections disposed in abutting relation to receive and handle the effluent in open channel flow and with uniform distribution in the absorption field derived from repeated hydraulic surges at opposite ends of the pipe system as caused by openings in the bottom of the pipe system large enough not to be blocked by solids and yet small enough to prevent too rapid discharge of effluent and spaced sufficiently apart to limit the rate of effluent outflow.

---

This invention relates to subsurface disposal systems and, more particularly, to septic tank drain fields.

For years, man has been disposing of human waste by means of subsurface disposal systems; however, very little accurate knowledge has previously existed concerning the phenomena which surrounds the use of such systems. It has been generally known that uniform distribution of the effluent from the septic tank is desirable, so as to not overload any particular part of the absorption field because this will result in clogging of that portion of the field at a time when the remainder of the field has still not been substantially used. Also, it is desirable to supply intermittent dosages to the absorption field, which prolongs the life thereof. Various efforts in the past have been made to obtain the desired uniform distribution of the effluent, primarily in the use of pipe, either in the form of bituminous pipe or tile which is placed in sections spaced apart to provide openings at the spaced joints, or with series of spaced apart openings on the side of the pipe, spaced between the top and bottom thereof, with these not providing the desired results.

An object of this invention is to provide a new and improved subsurface disposal system which provides for uniform distribution of the effluent through the absorption field.

Another object of the invention is to provide a subsurface disposal system having a combination of a septic tank with dosing chamber for periodically discharging a quantity of effluent therefrom and a distribution system for the effluent disposed in the ground and having a series of pipe sections in abutting relation, with an inlet connected to the outlet of the dosing chamber and a series of spaced apart openings along the bottom of the pipe which permits some discharge of effluent from the openings as the effluent flows along the pipe, but which retains sufficient flow of the effluent to establish a hydraulic surge at the end of the field to obtain a wave action causing reverse flow of the effluent through the pipe, with this wave action being repeated for a number of oscillations until all the effluent has discharged through the openings at the bottom of the pipe and with the over-all discharge being uniform from all of the openings.

Still another object of the invention is to provide a disposal system as defined in the preceding paragraph wherein the openings at the bottom of the pipe are spaced apart a minimal distance sufficient to obtain maximum utilization of the absorption field, while still not reducing the wave action of the effluent in the pipe.

Still another object of the invention is to provide a disposal system as defined in the preceding paragraphs wherein the openings are sufficiently large to prevent blockage by solids in the effluent, or by micro-organisms growing in the pipe, while still sufficiently small to prevent too great a discharge from the openings near the ends of the pipe when the flow of the effluent reverses.

Further objects and advantages will become apparent from the following detailed description taken in connection with the accompanying drawings in which:

FIG. 1 is a side elevational view of the disposal system with the septic tank and dosing chamber shown in section and with the distribution system shown partly broken away and associated with an absorption field;

FIG. 2 is a fragmentary section of the dosing chamber and associated structure with a different level of effluent in the chamber;

FIG. 3 is a view, similar to FIG. 2, showing the dosing chamber with a greater level of effluent therein; and FIG. 4 is a vertical section, taken lengthwise of a section of pipe used in forming the distribution system.

While this invention is susceptible of embodiment in many different forms, there is shown in the drawings and will herein be described in detail an embodiment of the invention with the understanding that the present disclosure is to be considered as an exemplification of the principles of the invention and is not intended to limit the invention to the embodiment illustrated. The scope of the invention will be pointed out in the appended claims.

The subsurface disposal system embodies a series of major components including a septic tank, indicated generally at 10; a dosing chamber, indicated generally at 11; a distribution system, indicated generally at 12; and an absorption field, indicated generally at 13. In operation, sewage enters the septic tank through a pipe 20 and collects therein until the liquid level rises above a weir 21. At such time, the liquid part of the sewage flows into the dosing chamber 11, with the solids being retained in the septic tank. A pair of baffles 22 and 23 extending downwardly from the top of the septic tank prevent direct flow across to the weir 21.

It is the function of the dosing chamber 11 to collect liquid until a certain volume is obtained and then substantially the entire volume is discharged as effluent into the distribution system 12. This intermittent discharge is desirable in that effluent is only delivered to the distribution system 12 and thus to the absorption field 13 at intervals, providing for best use of the absorption field and the dosage chamber causes the distribution system 12 to provide uniform distribution of effluent throughout the entire absorption field 13.

The dosing chamber has a U-shaped pipe 25 at the lower end thereof with an inlet end 26 extending up into the liquid part of the chamber and covered by a bell 27. The opposite end of the U-shaped pipe 25 has an outlet 28 connected to the inlet of the distribution system 12. The dosing chamber is shown in discharging operation in FIG. 1, with other stages being shown in FIGS. 2 and 3. After liquid has discharged from the dosing chamber down to the level shown in FIG. 2, air is sucked into the bell 27, causing an air lock which stops the flow of effluent from the dosing chamber and, at this time, the remaining liquid in the U-shaped pipe 25 returns to the equilibrium position shown. As liquid builds up in the dosing chamber 11, as shown in FIG. 3, the pressure on the air in the bell 27 becomes greater and this increase in pressure is transferred to the water in the U-shaped pipe 25, causing the liquid in the discharge side to rise, as shown in FIG. 3. When the liquid in the discharge side of the U-shaped pipe reaches the bottom of the discharge line 28, the liquid is free to flow out of the U-shaped pipe. A further increase in pressure, caused by an increase in liquid level in the dosing chamber, will now force water and the air, which was trapped under the bell 27, out of the U-shaped pipe, leaving a free path for the liquid in the dosing chamber to discharge therefrom out the discharge line 28. This action is shown occurring in FIG. 1.

The distribution system 12 extends from the discharge line 28 and can consist of two parallel sections spaced horizontally, one from the other, to each take approximately one-half of the effluent flow from the dosing chamber 11. As a safety feature, an overflow pipe 30 has an inlet 31 into the dosing chamber, whereby, if the syphon should become clogged, effluent can flow from the dosing chamber, through the pipe 30, into the distribution system 12 by connection thereto.

The distribution system 12 is shown positioned in the ground 35 and disposed within the absorption field 13 which may be the ground, if of suitable percolation characteristics, or can be suitably formed of gravel or other material, as shown in FIG. 1, which facilitates distribution of the effluent.

My work has shown that uniform distribution of effluent through the absorption field 13 cannot be obtained without the use of a dosing chamber which delivers a volume of effluent to the distribution system at one time. In developing a suitable distribution system 12, I have discovered that uniform distribution of effluent can be obtained if the effluent can be caused to travel as a wave back and forth along the distribution system until completely discharged. This has been accomplished by a design which causes delivery of sufficient effluent to the end of the system, with enough energy to bounce back along the entire length of the pipe, while avoiding a hydraulic jump at the end of the pipe. The undesired hydraulic jump occurs when the effluent changes from a small depth to a much greater depth within a very short distance which results in a considerable amount of energy being lost, which does not contribute to reverse flow of the effluent. As distinct from this in my improved distribution field, as the effluent flows to an end of the system a hydraulic surge forms and moves along the pipe of the system in the opposite direction. An important part of my design is that sufficient volume of effluent with sufficient energy is permitted to be retained in the pipe to cause the hydraulic surge and the reverse flow.

The distribution system 12 is made up of a series of pipes 40 connected in abutting relation and having an inlet end 41 connected to the discharge line 28 from the dosing chamber and an opposite end which can be closed by an end cap 42 or merely by surrounding ground material. The series of pipes 40 can be made of bituminous material or tile, although the former is preferred because of the simplicity in forming the openings therein which are an important part of the invention.

As shown in FIG. 4, and at the right-hand side of FIG. 1, each pipe section 40 has a series of spaced apart openings 43 located along the bottom thereof for discharge of effluent.

As effluent enters the inlet end 41 of the distribution system, some of the liquid will discharge from each of the openings 43 reached as the volume of liquid progresses along the system, with the discharge varying along the length of the system. When the volume of liquid reaches the end of the pipe, a hydraulic surge forms and returns along the pipe toward the inlet end 41 and again reverses, with this being repeated a number of times until all of the effluent is discharged through the bottom openings 43.

The size of the openings 43 and their spacing is critical in that the openings 43 cannot be too small, as they would then be clogged by solid material or tend to be closed by micro-organisms growing within the pipes. On the other hand, they cannot be too large, because then a too-large amount of flaw would occur at the remote ends of the system during the intervals that the liquid flow enters and reverses within the pipe, thus overloading the absorption field 13 adjacent the ends of the distribution system. From a number of tests opening sizes ranging from ½″ to ¾″ have been found to provide optimum results, with ⅝″ being an intermediate size.

The spacing of the openings 43 is also found to be an important consideration in that the openings should be spaced as near together as possible to provide maximum utilization of the absorption field 13; however, too close a spacing would reduce the wave effect found important to obtain uniform distribution. From tests, a range of 9″ to 15″ has been found suitable, with 12″ being a typical spacing for obtaining the desired results, along with the opening sizes described above.

Although not to be considered as limiting, an example of a suitable subsurface disposal system would include a septic tank 10 having a capacity of 1,000 gallons, a dosing chamber 11 having a capacity of 100 gallons, with an effective head in the dosing chamber of two feet. A distribution system 12 could be made up of a hundred feet of pipe 40, placed level, arranged in two fifty-foot sections parallel to one another and spaced at seven feet apart on center. The pipe can be of four inch diameter, with the distribution field either being disposed level or can have either a slight positive or negative slope.

My research has indicated that the presently-used pipe, having openings upwardly from the bottom of the pipe on each side thereof have a channeling effect on the effluent and cause the majority of the effluent to be discharged at the far end of the field. With my design, the effluent passes over the openings 43, discharging a small amount of effluent on the first pass. Once the effluent reaches the end of the pipe field, a wave is formed which passes back up the pipe to the beginning, where it is again stopped. The wave then moves back to the end of the pipe, opposite the inlet 41. Throughout this whole cycle, the effluent is discharging from all of the openings 43 along the pipe. At any instant, the distribution is not uniform, i.e., the same amount of effluent is not discharging from each of the openings. The net effect of all of these passes over the openings, however, does give a uniform distribution, i.e., the same amount of effluent leaving any foot of pipe is the same as any other foot. This results in uniform distribution over the entire absorption field 13 and, thus, the entire field is being used at the same time, which lengthens the life of the field.

My investigation showed that, ideally, the smaller the hole size and the greater the spacing therebetween the greater was the number of oscillations that would result, with the distribution uniformity increasing as the number of oscillations increased. However, a compromise has to be made in order to have the openings 43 as large as possible, as pointed out previously, and also spaced together as close as possible in order to obtain maximum utilization of the absorption field 13.

With the construction disclosed herein, periodic discharge of effluent from the dosing chamber 11 causes effluent to flow through the pipe as an open channel, that is, with the pipe not being full and, thus, not under pressure and with the size and spacing of the openings 43 in the pipe sections 40 providing for over-all uniform distribution of effluent into the distribution field 13 by oscillation of the effluent back and forth through the distribution system 12.

I claim:

1. A subsurface disposal system for septic tank effluent comprising, in combination, a septic tank with a dosing chamber for periodically discharging a quantity of effluent therefrom, and a distribution system for the effluent disposed in the ground and having an inlet connected to an outlet of the dosing chamber, said outlet comprising a U-shaped trap with one free end in the dosing chamber and the other end connected to said inlet with a dome member positioned over and covering said free end to define a chamber open only at a level beneath said free end to provide intermittent flow, said distribution system comprising a length of pipe having a series of spaced apart openings along the bottom thereof and a closed end opposite said inlet whereby a charge of effluent will pass back and forth along the pipe in a series of repeated waves to obtain variable discharge from the openings in each pass but ultimately obtain uniform discharge of effluent from all the pipe openings and into the surrounding field.

2. A disposal system as defined in claim 1 wherein said openings are large enough to prevent blockage by solids but small enough to prevent large discharge at an end of the pipe when the direction of effluent flow reverses in the pipe.

3. A disposal system as defined in claim 2 wherein said openings are approximately 5/8" in diameter.

4. A disposal system as defined in claim 2 wherein said openings are spaced apart a distance of from 9" to 15" in order to provide the desired number of waves to obtain uniform distribution.

5. A distribution system for use in uniformly distributing effluent from a septic tank having a dosing chamber for discharging quantities of effluent periodically from the septic tank, comprising a series of pipe sections laid end-to-end in abutting relation with an inlet end and a closed opposite end and of a capacity to handle effluent from the dosing chamber as an open channel flow, each of said sections having spaced apart openings only along the bottom thereof which are approximately ½" or larger in diameter to be large enough to not be blocked by solids or micro-organisms growing in the pipe and yet small enough to prevent too rapid discharge of effluent from either end of the system during the reversal of effluent flow, said openings are spaced approximately 9" to 15" apart to obtain maximum utilization of the surrounding absorptioin field while limiting the rate of effluent outflow to permit a number of oscillations of the effluent in the pipe sections, and intermittent effluent discharge means in the dosing chamber for periodically delivering a charge of the effluent whereby the respective charge of effluent will progress along the pipe sections discharging from a successively larger number of openings until the effluent reaches the closed end where a hydraulic surge forms within the pipe sections and moves toward the inlet end with this action repeating until all the effluent is discharged from the pipe.

References Cited

UNITED STATES PATENTS

| 292,046 | 1/1884 | Powers | 61—13 X |
| 2,802,339 | 8/1957 | Fogerty | 61—11 |
| 3,339,365 | 9/1967 | Uden | 61—13 |
| 1,070,227 | 8/1913 | Bonson | 61—11 |
| 3,224,200 | 12/1965 | Achey | 61—13 |

EARL J. WITMER, *Primary Examiner.*